(12) United States Patent
Fujii

(10) Patent No.: US 11,819,914 B2
(45) Date of Patent: Nov. 21, 2023

(54) SILVER POWDER, METHOD FOR PRODUCING THE SAME, AND CONDUCTIVE PASTE

(71) Applicant: DOWA ELECTRONICS MATERIALS CO., LTD., Tokyo (JP)

(72) Inventor: Masanori Fujii, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 17/912,997

(22) PCT Filed: Mar. 24, 2021

(86) PCT No.: PCT/JP2021/012291
§ 371 (c)(1),
(2) Date: Sep. 20, 2022

(87) PCT Pub. No.: WO2021/193736
PCT Pub. Date: Sep. 30, 2021

(65) Prior Publication Data
US 2023/0159376 A1    May 25, 2023

(30) Foreign Application Priority Data
Mar. 26, 2020    (JP) .................................. 2020-056384

(51) Int. Cl.
| H01B 1/22 | (2006.01) |
| C03C 4/14 | (2006.01) |
| B22F 1/08 | (2022.01) |
| B22F 1/16 | (2022.01) |
| B22F 1/103 | (2022.01) |
| B22F 1/107 | (2022.01) |
| B22F 1/17 | (2022.01) |
| B22F 9/24 | (2006.01) |
| C03C 8/16 | (2006.01) |
| C03C 8/18 | (2006.01) |
| B22F 1/05 | (2022.01) |

(52) U.S. Cl.
CPC .............. B22F 1/08 (2022.01); B22F 1/103 (2022.01); B22F 1/107 (2022.01); B22F 1/16 (2022.01); B22F 1/17 (2022.01); B22F 9/24 (2013.01); C03C 4/14 (2013.01); C03C 8/16 (2013.01); C03C 8/18 (2013.01); H01B 1/22 (2013.01); *B22F 1/05* (2022.01); *B22F 2301/255* (2013.01); *B22F 2302/25* (2013.01); *B22F 2304/10* (2013.01)

(58) Field of Classification Search
CPC ..... H01B 1/22; C03C 4/14; B22F 1/08; B22F 1/16
See application file for complete search history.

(56) References Cited

U.S. PATENT DOCUMENTS

| 5,458,702 A * | 10/1995 | Ono .......................... C22C 9/00 |
| | | 252/514 |
| 5,837,356 A | 11/1998 | Katori et al. |
| 2007/0212564 A1* | 9/2007 | Sasaki ...................... C23C 26/02 |
| | | 75/343 |
| 2008/0145633 A1 | 6/2008 | Kodas et al. |
| 2009/0114885 A1* | 5/2009 | Yamaguchi ................ C09J 9/02 |
| | | 252/519.21 |
| 2011/0192457 A1 | 8/2011 | Nakayama et al. |
| 2012/0247817 A1 | 10/2012 | Hommura et al. |
| 2015/0104625 A1* | 4/2015 | Shiozawa ................. C22C 5/06 |
| | | 252/514 |
| 2017/0333996 A1 | 11/2017 | Liu et al. |
| 2018/0315868 A1 | 11/2018 | Yeh et al. |

FOREIGN PATENT DOCUMENTS

| CN | 105728714 A | 7/2016 |
| JP | 9-232727 A | 9/1997 |
| JP | 2004-79211 A | 3/2004 |
| JP | 2005-267900 A | 9/2005 |
| JP | 2005-298933 A | 10/2005 |
| JP | 2009-541588 A | 11/2009 |
| JP | 2009-542006 A | 11/2009 |
| JP | 2010-257958 A | 11/2010 |
| JP | 2012-209148 A | 10/2012 |
| JP | 2018-190967 A | 11/2018 |
| WO | 2010/016186 A1 | 2/2010 |

OTHER PUBLICATIONS

Jung et al "Composite conducting powders with core-shell structure as the new concept of electrode material", Colloids and Surfaces A: Physicochem. Eng. Aspects 360 (2010) 69-73.*

Durairaj et al "Rheology and processability of diglycidylether of bisphenol-A (DGEBA) and polyurethane (PU) based isotropic conductive adhesives filled with different size-distributed silver flakes and silver particles", Engineering Letters, 21:3, EL_21_3_06.*

International Search Report and Written Opinion of the International Searching Authority issued in International Patent Application No. PCT/JP2021/012291, dated Jun. 15, 2021, along with an English translation thereof.

International Preliminary Report on Patentability in International Patent Application No. PCT/JP2021/012291, dated Sep. 22, 2022, along with an English translation thereof.

* cited by examiner

*Primary Examiner* — Mark Kopec
(74) *Attorney, Agent, or Firm* — GREENBLUM & BERNSTEIN, P.L.C.

(57) ABSTRACT

A silver powder containing: silver particles; and an adherent that is attached to surfaces of the silver particles and contains a metal oxide that has a melting point lower than a melting point of silver.

9 Claims, 2 Drawing Sheets

SILVER POWDER, METHOD FOR PRODUCING THE SAME, AND CONDUCTIVE PASTE

TECHNICAL FIELD

The present invention relates to a silver powder, a method for producing the same, and a conductive paste.

BACKGROUND ART

In recent years, there is a demand for a silver powder-containing conductive paste that can form a fine-line structure in which a highly dense conductor pattern with miniaturized electronic components and a reduction in the wire thickness are achieved. Also, in order to increase the light collection area of a solar cell to improve the power generation efficiency of the solar cell, a finger electrode that has the fine-line structure is required.

As the conductive paste, for example, a conductive paste that contains, as an additive, a low-melting point metal such as metallic tellurium or a tellurium oxide has been proposed (see, for example, Patent Document 1). By containing a low-melting point metal, when the conductive paste is used to form, for example, an electrode of a solar cell, the contact resistance of the solar cell can be improved. As used herein, the term "low-melting point metal" refers to a metal that has a melting point of 500° C. or less. Examples of the low-melting point metal include zinc (with a melting point of 419.6° C.), lead (with a melting point of 327.5° C.), tin (with a melting point of 231.97° C.), bismuth (with a melting point of 271.3° C.), tellurium (with a melting point of 449.5° C.), and selenium (with a melting point of 217° C.). Furthermore, it is possible to use, instead of the low-melting point metal, a substance (a low-melting point metal-based compound such as tellurium dioxide) that has a melting point less than or equal to the firing temperature of the conductive paste, or a substance that causes a chemical reaction (physical change) at a temperature less than or equal to the firing temperature of the conductive paste.

Also, for example, as the conductive paste, a conductive paste that contains, as an additive, a tellurium alloy compound such as silver telluride has also been proposed (see, for example, Patent Document 2).

CITATION LIST

Patent Documents

Patent Document 1: WO 2010/016186
Patent Document 2: JP 2018-190967A

SUMMARY OF INVENTION

Technical Problem

In the fine-line structure in which a highly dense conductor pattern and a reduction in the wire thickness are achieved, in order to suppress the conductor resistance while reducing the contact area, there is a demand for an increase in the electrode height (aspect ratio) relative to the contact width.

Also, in order to enhance the reliability of the conductive pattern, the conductive pattern is required to have a high adhesive strength with respect to an underlying layer. For example, in the case of a solar cell, there is a problem such as separation of electrodes such as a finger electrode and a busbar electrode, and these electrodes are required to have a high adhesive strength with respect to an Si surface or an SiN surface that serves as the underlying layer.

However, in the conductive pastes disclosed in Patent Documents 1 and 2, it is not possible to increase the adhesive strength between the conductive pattern and the underlying layer, and thus separation of electrodes is likely to occur when the aspect ratio of the conductive pattern is increased.

It is an object of the present invention to provide a silver powder that can provide a high adhesive strength when the silver powder is used to form a conductive pattern, and a method for producing the silver powder, and a conductive paste that contains the silver powder.

Solution to Problem

The inventors of the present application conducted studies on why it is not possible to increase the adhesive strength of the conductive pattern when the conductive pattern is formed using a conductive paste that contains a low-melting point metal oxide powder together with silver particles. They considered that the reduction in the adhesive strength is caused by the difference in specific gravity between silver and the metal oxide powder. The specific gravity of the low-melting point metal oxide is smaller than the specific gravity (about 10.5 $g/cm^3$) of silver. The silver powder particles and the metal oxide powder particles can freely migrate in the conductive paste, and thus the particles with a large specific gravity aggregate together and the particles with a small specific gravity aggregate together before or after application of the conductive paste, which may cause the silver particles and the metal oxide powder particles to be distributed unevenly.

Some metal oxides have the effect of lowering the softening point temperature of a glass frit that is mixed with the conductive paste. As a result of the softening point temperature of the glass frit being lowered, when the coating film is fired, glass particles can flow rapidly and migrate to the interface between the film and the substrate to form a strong bond and ensure adhesion strength before the silver particles are sintered. If the metal oxide powder particles are distributed unevenly, a variation occurs in the softening point temperature of the glass, as a result of which, it is expected that the effect of lowering the softening point temperature of the glass frit cannot be effectively exhibited. Furthermore, the inside of the conductive pattern film becomes nonuniform after firing, which may increase the possibility of breakage of the film caused by contact points between different phases. Accordingly, the inventors of the present application considered that, as long as the metal oxide powder particles are evenly distributed in the film, the contact points that cause the breakage of the film due to the inside of the conductive pattern film becoming nonuniform can be reduced to improve the strength of the conductive pattern.

In view of the above, the inventors of the present application conducted studies on a method for suppressing an uneven distribution of silver particles and low-melting point metal oxide powder particles, and they paid an attention to a method in which a low-melting point metal oxide is attached in advance to the surfaces of silver particles that have a large specific gravity as an adherent. The inventors of the present application found that, by attaching a low-melting point metal oxide to silver particles as described above, even when the resulting silver powder is incorporated in a conductive paste, it is possible to suppress an uneven distribution of the low-melting point metal oxide particles caused by the difference in specific gravity, and increase the adhesive strength of the conductive pattern. As a result, even when the conductive pattern is formed at a high aspect ratio, it is possible to reduce separation of electrodes.

The following aspects have been made based on the findings described above.

A first aspect of the present invention relates to a silver powder including: silver particles; and an adherent that is attached to surfaces of the silver particles and contains a metal oxide that has a melting point lower than a melting point of silver.

A second aspect of the present invention is configured such that, in the first aspect, the metal oxide is at least one of a Te oxide, a Bi oxide, a Pb oxide, a T1 oxide, and a V oxide.

A third aspect of the present invention is configured such that, in the first or second aspect, an amount of a metal component that constitutes the metal oxide is 0.01 mass % to 10 mass % relative to an amount of silver.

A fourth aspect of the present invention is configured such that, in any one of the first to third aspects, the adherent includes a first adherent that contains the metal oxide and a second adherent that contains a metal that is the metal component that constitutes the metal oxide or an alloy made of the metal component and silver.

A fifth aspect of the present invention is configured such that, in the fourth aspect, the metal component is at least one of Te, Bi, Pb, Tl, and V.

A sixth aspect of the present invention is configured such that, in any one of the first to fifth aspect, a total amount of the metal component, excluding silver, that constitutes the metal oxide of the adherent is 0.1 mass % to 10 mass % relative to an amount of silver.

A seventh aspect of the present invention relates to a method for producing the silver powder according to the first aspect, the method including the step of: adding a reducing agent and an aqueous solution that contains a metal component that constitutes a metal oxide that has a melting point lower than a melting point of silver to a silver complex solution, wherein the metal oxide of the metal component is deposited on the surfaces of the silver particles to attach the metal oxide of the metal component to the surfaces of the silver particles while the silver particles are deposited through reduction.

An eighth aspect of the present invention relates to a conductive paste including: the silver powder according to any one of the first to sixth aspects; a silver powder that is free of an adherent that contains a metal on a surface of the silver powder; an organic binder; a glass frit; and a solvent.

A ninth aspect of the present invention is configured such that, in the eighth aspect, an amount of the metal component that constitutes the metal oxide contained in the silver powder according to any one of the first to sixth aspects is 0.001 mass % to 0.03 mass % relative to an amount of silver contained in the conductive paste.

Advantageous Effects of Invention

It is possible to obtain a high adhesive strength when a conductive pattern is formed.

DESCRIPTION OF EMBODIMENTS

One Embodiment of the Present Invention

Figure 1:
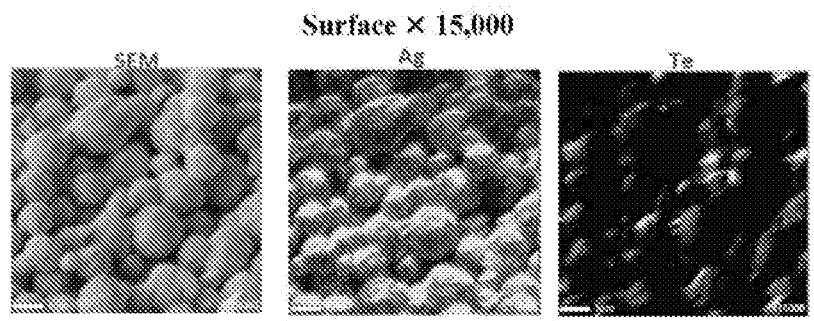
FIG. 1 is a diagram showing elemental mapping images of a surface of a silver powder obtained in Example 1.

Hereinafter, one embodiment of the present invention will be described. In the specification of the present application, the expression "silver particles" is used when indicating individual silver particles, and the expression "silver powder" is used when treating a large number of silver particles as a collection of silver particles. Also, the range of numerical values indicated by the use of "to" means that the numeral values indicated before and after "to" are included as the lower limit value and the upper limit value.

(Silver Powder)

A silver powder is incorporated in a conductive paste for forming conductive patterns such as electrodes and circuits in electronic components (for example, solar cells or the like). A silver powder according to the present embodiment is a metal oxide-attached silver powder that contains silver particles and an adherent that is attached to the surfaces of the silver particles and contains a metal oxide that has a melting point lower than the melting point of silver.

The adherent contains a metal oxide that has a melting point lower than the melting point of silver. The adherent lowers the softening point temperature of a glass frit that is contained in the conductive paste during the process of sintering the conductive paste. By lowering the softening point temperature of the glass, it is possible to facilitate glass particles to flow rapidly and evenly migrate to the interface between a coating film and a substrate before the silver particles are sintered. As a result, micro-cracks can be reduced in a conductor pattern obtained after firing to increase the strength of the conductor pattern, and also increase the adhesive strength with respect to an underlying layer.

The adherent is attached to the silver particles to cover a portion of or the entire surfaces of the silver particles. It is preferable that the adherent is distributed in a dotted manner on the surfaces of the silver particles to cover a portion of the surfaces of the silver particles. Here, the term "attach" refers to a state in which the adherent is more firmly attached to the surfaces of the silver particles as compared with a state in which the adherent simply adheres to the surfaces of the silver particles. In the case where a silver powder and a low-melting point metal oxide powder are simply mixed, if the metal oxide powder adheres to the surfaces of the silver particles, the metal oxide powder easily detaches from the surfaces of the silver particles. In the present embodiment, as will be described later, a low-melting point metal oxide is deposited such that the low-melting point metal oxide is attached to the surfaces of the silver particles when the silver particles are deposited through reduction. For this reason, the adherent can be attached to the silver particles at such a strength that, for example, the adherent does not separate from the surfaces of the silver particles even when the metal oxide-attached silver powder is crushed. With this configuration, even when the metal oxide-attached silver powder is mixed and kneaded with the conductive paste, the adherent can remain present together with the silver particles. That is, an uneven distribution of the silver particles and the low-melting point metal oxide can be suppressed.

The adherent contains a metal oxide. There is no particular limitation on the metal oxide as long as the metal oxide has a melting point lower than the melting point of silver. However, it is preferable that the metal oxide is, for example, a tellurium (Te) oxide, a bismuth (Bi) oxide, a lead (Pb) oxide, a thallium (Tl) oxide, or a vanadium (V) oxide. Examples of the Te oxide, the Bi oxide, the Pb oxide, the Tl oxide, and the V oxide include $TeO_2$ (with a melting point of 733° C.), $B_2O_3$ (with a melting point of 817° C.), $PbO_2$ (with a melting point of 223° C.), $Pb_3O_4$ (with a melting point of 686° C.), PbO (with a melting point of 290° C.), $Tl_2O_3$ (with a melting point of 717° C.), and $V_2O_5$ (with a melting point of 690° C.). These oxides have melting points lower than the melting point (962° C.) of silver. Out of these, in particular, it is more preferable that the metal oxide is a tellurium (Te) oxide or a bismuth (Bi) oxide. Using these oxides, the softening point temperature of the glass frit that is added to the conductive paste can be lowered. Accordingly, for example, the gaps between silver particles can be easily filled with molten glass when the conductive paste is fired, which facilitates the silver particles to adhere and fuse with each other. As a result, the strength of the conductor pattern can be improved. In addition thereto, the contact resistance of the conductor pattern can be reduced by fire-through.

The adherent of the present embodiment may include a first adherent that contains the above-described metal oxide and a second adherent that is different from the first adherent. The second adherent contains a metal that is the metal component that constitutes the metal oxide contained in the first adherent or an alloy made of the metal component and silver. In the case where the metal oxide contained in the first adherent is a Te oxide, a Bi oxide, a Pb oxide, a Tl oxide, or a V oxide, the second adherent may contain an elemental metal such as Te, Bi, Pb, Tl, or V, or an alloy made of any one of the elemental metals and silver. For example, in the case where the first adherent contains a Te oxide, the second adherent may contain elemental metal Te or an Ag—Te alloy. Furthermore, the adherent may contain silver together with the metal oxide, and the metal oxide and silver may be in an amorphous state.

In the surfaces of the silver particles, the ratio of the first adherent to the second adherent is preferably 1:9 to 10:0 (the proportion of the first adherent is preferably 10 to 100%), and more preferably 1:9 to 9:1 (the proportion of the first adherent is more preferably 10 to 90%). The term "the ratio of the first adherent to the second adherent" used herein indicates the ratio of the number of atoms of the metal component that constitutes the first adherent to the number of atoms of the metal component that constitutes the second adherent. When the second adherent is contained, the adhesion between the first adherent and the surfaces of the silver particles can be further increased. The ratio of the number of atoms of the metal component that constitutes the metal oxide contained in the first adherent to the number of atoms of the metal component (excluding silver in the alloy) contained in the second adherent is determined from results of measurement performed by analyzing the state of the surfaces of the silver particles based on ESCA. In the ESCA measurement, a sample in which silver particles are densely present is used, and measurement is performed on the surfaces of a plurality of silver particles (for example, 100 or more silver particles) by setting the analysis area to, for example, 800 μmφ.

Tellurium is a metalloid element. However, in the specification of the present application, for the sake of convenience, it will be treated as a metal or a metal that is the metal component or the metal oxide, without distinguishing it from other metal elements.

In the metal oxide-attached silver powder, the total amount of the metal component, excluding silver, that constitutes the metal oxide of the adherent is preferably 0.1 mass % to 10 mass %, and more preferably 0.1 mass % to 3 mass % relative to the amount of silver contained in the metal oxide-attached silver powder. As used herein, the total amount of the metal component, excluding silver, that constitutes the metal oxide refers to, in the case where, for example, the adherent is made of a metal component, or the adherent is made of a metal oxide and silver in an amorphous state, the amount of the metal component that constitutes the metal oxide. Also, in the case where, for example, the adherent includes a first adherent and a second adherent, the total amount of the metal component, excluding silver, that constitutes the metal oxide refers to the total amount of the metal component that constitutes the metal oxide contained in the first adherent and the metal component (excluding silver in the alloy) contained in the second adherent. In the case where the adherent includes a first adherent and a second adherent, in the total amount of the metal component, the proportion of the metal component that constitutes the metal oxide contained in the first adherent is preferably 10 to 100%, and the amount of the metal component that constitutes the metal oxide is preferably 0.01 mass % to 10 mass %, more preferably 0.01 mass % to 9 mass %, and even more preferably 0.1 mass % to 3 mass % relative to the amount of silver contained in the metal oxide-attached silver powder. By setting the amount of the metal component that constitutes the metal oxide to 0.01 mass % or more relative to the amount of silver, the advantageous effects produced by the low-melting point metal oxide can be reliably obtained. On the other hand, if the amount of the low-melting point metal oxide is too large, the resistance of the conductive pattern increases, which may impair conductivity. In this regard, by setting the amount of the metal component that constitutes the metal oxide to 10 mass % or less relative to the amount of silver, the conductivity of the conductor pattern can be maintained at a high level while obtaining the advantageous effects produced by the low-melting point metal oxide.

The amount of silver contained in the metal oxide-attached silver powder and the total amount of the metal component that constitutes the metal oxide contained in the first adherent and the metal component, excluding silver, contained in the second adherent may be measured in the manner described below. The amount of silver may be measured based on a weight method (mass method) that includes completely dissolving the metal oxide-attached silver powder in nitric acid, adding hydrochloric acid to precipitate silver chloride, filtering the precipitate, and measuring the mass of silver chloride. The total amount of the metal component that constitutes the metal oxide contained in the first adherent and the metal component contained in the second adherent may be obtained by heating and dissolving the metal oxide-attached silver powder in nitric acid, completely dissolving the metal oxide-attached silver powder using aqua regia or the like, where necessary, and performing measurement based on inductively coupled plasma (ICP) spectrometry or the like. In the present embodiment, the measurement is performed using nitric acid as described above without distinguishing the first adherent and the second adherent from each other because the Te oxide is dissolved in nitric acid together with Te. However, in the case where the metal oxide is not at all dissolved in nitric acid and thus can be recovered as a precipitate, the amount of the metal component that constitutes the metal oxide in the first adherent may be determined from the amount of the metal oxide recovered through solid-liquid separation, and the amount of the metal component, excluding silver, contained in the second adherent may be determined from the filtrate.

There is no particular limitation on the particle size of the metal oxide-attached silver powder. However, it is preferable that the volume-based cumulative 50% particle size (D50) is 0.5 µm to 4 µm. The particle size distribution may be obtained by dispersing 0.1 g of silver powder in isopropyl alcohol (IPA), stirring it for 2 minutes using a biomixer (Model BM-4) available from Nihonseiki Kaisha Ltd., and then performing measurement using a laser diffraction particle size distribution measurement apparatus (Microtrac MT 3300 EXII available from Nikkiso Co., Ltd). There is no particular limitation on the shape of an individual particle of the metal oxide-attached silver powder. However, the shape of an individual particle of the metal oxide-attached silver powder may be, for example, spherical, elliptic, flaky, or amorphous. There is no particular limitation on the specific surface area of the metal oxide-attached silver powder based on the BET single point method. However, the specific surface area is preferably, for example, 0.45 to 1.2 $m^2/g$.

(Method for Producing Silver Powder)

Next, a method for producing the metal oxide-attached silver powder described above will be described.

First, a silver complex solution for forming silver particles is prepared. The silver complex solution may be prepared by, for example, adding a complexing agent to an aqueous solution containing silver ions to generate a silver complex. The aqueous solution of silver complex may be, for example, an aqueous solution of silver-ammine complex, or the like.

As the supply source of silver ions, a known supply source of silver ions can be used. For example, an inorganic silver salt such as silver nitrate, silver sulfate, silver carbonate, silver chloride, or silver oxide can be used. The concentration of silver ions in the aqueous solution is preferably 0.1 mass % to 10 mass % before adding a reducing agent, which will be described later.

As the complexing agent for silver ions, for example, ammonia water, ammonium ions such as an ammonium salt, or a chelate compound such as an ethylene diamine tetraacetic acid (EDTA) salt can be used. Out of these, it is preferable to use ammonium ions because ammonium ions are likely to form a complex with silver ions, and can be easily washed away, and thus impurities are unlikely to remain. When ammonium ions are used as the complexing agent, a silver-ammine complex is formed in the aqueous solution. At this time, the coordination number of the ammine complex is 2, and thus 2 or more moles of ammonium ions may be added per mol of silver ions.

Also, a reducing agent for reducing the silver complex to deposit silver particles is prepared. As the reducing agent, a conventionally known reducing agent can be used. For example, it is possible to use formalin, ascorbic acid, hydrazine, alkanolamine, hydroquinone, oxalic acid, formic acid, aldehyde, alcohol, organic substances of saccharides, lower oxides of metals, sodium borohydride, and the like. Out of these, it is preferable to use ascorbic acid, glucose, formaldehyde, hydrazine, and hydrazine carbonate, and it is more preferable to use formaldehyde, hydrazine, and hydrazine carbonate because they have stable reactivity and can rapidly reduce silver. The reducing agents may be used alone or in a combination of two or more.

Also, in the present embodiment, in order to form, on the surfaces of the silver particles, an adherent that contains a metal oxide that has a melting point lower than the melting point of silver, an aqueous solution that contains a metal component that constitutes a metal oxide that has a melting point lower than the melting point of silver (or in other words, a metal component that forms a metal oxide that has a melting point lower than the melting point of silver when it is oxidized) is prepared. Specifically, the aqueous solution that contains the metal component may be prepared by dissolving, for example, an oxide of a metal selected from Te, Bi, Pb, Tl, and V, or an inorganic salt such as a nitric salt in water. The aqueous solution becomes acidic or basic as a result of an inorganic salt that contains the metal component being dissolved. From the viewpoint of preventing the pH of the aqueous solution of silver complex from being varied significantly, it is preferable that the aqueous solution has a pH of 9 or more and is basic. In the case where an aqueous solution obtained by dissolving an inorganic salt that contains the metal component is acidic, an alkali solution such as NaOH may be added in advance before a reduction takes place so as to adjust the pH to 9 or more.

Next, the reducing agent and the aqueous solution that contains the metal component are added to the silver complex solution. By adding the reducing agent, silver particles are deposited through reduction from the silver complex. Also, by adding the aqueous solution that contains the metal component, the metal is deposited on the surface of deposited silver particles, and an adherent that contains an oxide of the metal can be formed. In this way, a slurry that contains a metal oxide-attached silver powder is obtained.

There is no particular limitation on the amount of the reducing agent added. However, from the viewpoint of increasing the yield of silver, the amount of the reducing agent added is preferably 1 equivalent or more relative to the amount of silver.

As a method for adding the reducing agent, from the viewpoint of suppressing aggregation of the metal oxide-attached silver powder deposited through reduction, it is preferable to add the reducing agent at a rate of 1 equivalent/min or more relative to the amount of silver ions. Also, it is preferable that the reaction solution is stirred during a period from the time when the reducing agent is added to the time when the deposition through reduction ends. Also, the temperature of the reaction solution during reduction is preferably 5° C. to 80° C., and more preferably 5° C. to 40° C.

As a method for adding the aqueous solution that contains the metal component, the aqueous solution may be added during a period from the time when the reducing agent is added to the time when deposition of silver particles ends. In particular, the aqueous solution may be added during a period in which the reducing power of the reducing agent added to the aqueous solution of silver complex lasts. For example, the aqueous solution may be added within several seconds after the reducing agent has been added. Also, for example, the reducing agent may be added after the start of adding the aqueous solution to the aqueous solution of silver complex in advance. On the other hand, if the addition of the aqueous solution is excessively delayed after the reducing agent has been added, the grain growth of the silver particles preferentially takes place, and thus the deposition of the metal component on the surfaces of the silver particles is inhibited, as a result of which, it may not be possible to form an adherent.

Also, the reducing agent and the aqueous solution that contains the metal component may be added to the silver complex solution, and the reducing agent may be further added after the metal oxide-attached silver powder starts to be deposited. By further adding the reducing agent, the attachment of the metal oxide can be promoted.

A surface treatment agent may be added to the obtained slurry as needed. Using the surface treatment agent, it is possible to maintain the dispersion of the metal oxide-attached silver powder. As the surface treatment agent, a conventionally known surface treatment agent such as, for example, a fatty acid or a salt thereof can be used.

Next, the obtained slurry is filtered to recover the metal oxide-attached silver powder. After that, the recovered metal oxide-attached silver powder is washed with water. It is preferable to wash the metal oxide-attached silver powder with water until the electrical conductivity of the liquid that has passed through the metal oxide-attached silver powder reaches 0.2 mS/m or less.

Next, the water-washed metal oxide-attached silver powder is dried by, for example, vacuum drying. As the drying condition, for example, the metal oxide-attached silver powder may be dried at 73° C. for 10 hours. Through the drying, a dried powder is obtained. In the dried powder, a portion of or the entire metal component contained in the adherent may be oxidized.

Next, the obtained dried powder is crushed to obtain a metal oxide-attached silver powder of the present embodiment. In the metal oxide-attached silver powder, the adherent is attached to the surfaces of the silver particles, and thus even when the metal oxide-attached silver powder is crushed, detachment of the adherent can be suppressed.

(Conductive Paste)

Next, the conductive paste will be described.

The conductive paste according to the present embodiment includes: a silver powder (metal oxide-attached silver powder) that includes an adherent as described above on the surfaces of silver particles; a silver powder that is free of an adherent that contains a metal on the surface thereof; an organic binder; a glass frit; and a solvent.

As used herein, the term "silver powder that is free of an adherent that contains a metal on the surface thereof" described above refers to a silver powder that includes neither a first adherent such as the metal oxide-attached silver powder described above nor a second adherent on the surface thereof, and it is preferable that the silver powder does not contain a metal component other than silver on the surface thereof excluding unavoidable impurities from production. By incorporating the silver powder in the conductive paste, the proportion of the metal oxide-attached silver powder in the conductive paste is reduced. As a result, the amount of the metal component contained in the conductive paste can be reduced to reduce the resistance of the conductive pattern, and increase the conductivity of the conductive pattern. A conventionally known surface treatment agent, such as a fatty acid, that is known to be used in a silver powder may be attached to the surface of the silver powder that is free of an adherent that contains a metal on the surface thereof.

There is no particular limitation on the silver powder that is free of an adherent that contains a metal on the surface thereof, and a conventionally known silver powder can be used. Also, the shape of the silver powder is not particularly limited, and can be selected as appropriate from various shapes such as, for example, a spherical shape, a flaky shape, a resin shape, and a wire shape. A plurality of silver powders with different shapes may be used together.

There is no particular limitation on the ratio of the metal oxide-attached silver powder to the silver powder that is free of an adherent that contains a metal on the surface thereof that are added to the conductive paste. However, the ratio is preferably set such that the amount of metal component derived from the adherent in the metal oxide-attached silver powder is 0.001 mass % to 0.03 mass % relative to the total amount of silver in the conductive paste.

As the organic binder, a known resin or a resin that has been dissolved in a solvent can be used. Examples include organic binders including: cellulose derivatives such as methyl cellulose, ethyl cellulose, and carboxymethyl cellulose; polyvinyl alcohols; polyvinyl pyrrolidones; acrylic resin; alkyd resin; polypropylene resin; polyvinyl chloride resin; polyurethane resin; rosin resin; terpene resin; phenol resin; aliphatic petroleum resin; polyvinyl acetate resin; vinyl acetate-acrylic ester copolymers; and butyral resin derivatives such as polyvinyl butyral. These may be used alone or in a combination of two or more.

As the glass frit, it is preferable to use a glass frit that mainly contains a component selected from lead (Pb), tellurium (Te), lithium (Li), zinc (Zn), silicon (Si), aluminum (Al), and bismuth (Bi). The glass frit may contain, as other components, sodium (Na), potassium (K), boron (B), tungsten (W), molybdenum (Mo), manganese (Mn), iron (Fe), vanadium (V), phosphorus (P), antimony (Sb), magnesium (Mg), calcium (Ca), strontium (Sr), barium (Ba), titanium (Ti), zirconium (Zr), lanthanum (La), and the like. The term "contain" is used when the amount of a component is 0.1 mass % or more in terms of ICP analysis value.

The glass frit can be selected as appropriate according to the intended application of the conductive paste. For example, for a solar cell application, it is preferable to use a glass frit called a "Pb—Te—Bi glass frit". This glass frit is preferable because it moderately erodes an anti-reflection layer formed on the semiconductor layer of a solar cell and bonds a fired product of the conductive paste, or in other words, a silver electrode to the semiconductor layer.

The solvent can be selected as appropriate according to the intended application of the conductive paste. For example, one or more solvent can be selected from among the following solvents and used: butyl carbitol acetate (BCA), butyl carbitol (BC), ethyl carbitol acetate (ECA), ethyl carbitol (EC), hexane, toluene, ethyl cellosolve, cyclohexanone, butyl cellosolve, butyl cellosolve acetate, diethylene glycol diethyl ether, diacetone alcohol, terpineol, methyl ethyl ketone, benzyl alcohol, methyl ethyl ketone, methyl isobutyl ketone, tetradecane, tetralin, propyl alcohol, isopropyl alcohol, dihydroterpineol, dihydroterpineol acetate, ethyl carbitol, 2,2,4-trimethyl-1,3-pentanediol monoisobutyrate (texanol), and the like. The amount of the solvent is preferably 1 to 40 mass % relative to the amount of the conductive paste.

Also, the conductive paste may further contain components other than the components described above as needed. Examples of other components include a surfactant, a dispersing agent, a rheology modifier, a silane coupling agent, an ion collecting material, and the like.

Advantageous Effects of the Present Embodiment

According to the present embodiment, one or more of the following advantageous effects can be obtained.

As a comparative configuration, when, for example, a silver powder and a metal oxide powder that has a melting point lower than the melting point of silver are added to the conductive paste, and the conductive paste is applied to a substrate, particles with a large specific gravity aggregate together and particles with a small specific gravity aggregate together, resulting in an uneven distribution, and thus the metal oxide powder particles may be unevenly distributed. When the coating film in which the particles are unevenly distributed is subjected to firing, a variation occurs in the softening point temperature of the glass frit, which makes the film itself nonuniform and increases the possibility of breakage of the film caused by contact points between different phases. As a result, not only the strength of the resulting conductor pattern is lowered due to the occurrence of cracks, but also a sufficient adhesive strength with respect to the substrate cannot be ensured.

In this regard, in the metal oxide-attached silver powder of the present embodiment, a metal oxide that has a melting point lower than the melting point of silver is attached to the surfaces of the silver particles. When the conductive paste that contains the metal oxide-attached silver powder is applied to a substrate, it is possible to suppress the uneven distribution of silver particles and low-melting point metal oxide particles in the coating film caused by the difference in specific gravity between silver and the low-melting point metal oxide. As a result, it is possible to reduce micro-cracks in the conductive pattern and increase the strength of the conductor pattern, and also increase the adhesive strength with respect to the substrate of the conductor pattern.

The metal oxide that has a melting point lower than the melting point of silver contained in the adherent is preferably at least one of a Te oxide, a Bi oxide, a Pb oxide, a Tl oxide, and a V oxide. Using these oxides, excessive sintering of the silver particles can be more reliably suppressed, and thus the strength and the adhesive strength of the conductive pattern can be further increased. In addition thereto, the softening point temperature of the glass frit can be further lowered using a Te oxide and a Bi oxide, and thus the strength of the conductor pattern can be further increased.

Also, in the case where the adherent contains only a metal oxide that has a melting point lower than the melting point of silver contained in the adherent, the amount of the metal oxide is preferably 0.01 mass % to 10 mass % relative to the amount of silver contained in the metal oxide-attached silver powder. Also, in the case where the adherent contains not only the first adherent that contains the metal oxide but also a second adherent that contains a metal component that constitutes a metal oxide or an alloy made of the metal component and silver, the total amount of the metal component is preferably 0.1 mass % to 10 mass % relative to the amount of silver contained in the metal oxide-attached silver powder. With the amount described above, it is possible to obtain the effect of improving the strength and the adhesive strength of the conductor pattern produced by the metal oxide while suppressing a reduction in conductivity caused by the metal oxide.

EXAMPLES

Next, the present invention will be described in further detail based on examples. However, the present invention is not limited to the examples given below.

Example 1

(Production of Metal Oxide-Attached Silver Powder)

A silver complex solution was first prepared. Specifically, an aqueous solution of silver-ammine complex was obtained by placing 3670.1 g of an aqueous solution of silver nitrate at a silver concentration of 1.4 mass % in a glass beaker and adding 161.8 g of ammonia water at a concentration of 28 mass % (2.67 molar equivalent of ammonia relative to 1 mol of silver) to the aqueous solution of silver nitrate.

An aqueous solution of formaldehyde at a concentration of 21.0 mass % was prepared as a reducing agent by diluting formalin with pure water. Furthermore, an aqueous solution of tellurium was prepared as an aqueous solution containing a metal component for forming a metal oxide that has a melting point lower than the melting point of silver when oxidized. The aqueous solution of tellurium was prepared by adding and dissolving 3.4 g of tellurium dioxide (a tellurium dioxide powder with a purity of 99.9% available from Wako Pure Chemical Industries, Ltd.) in 10 g of an aqueous solution of sodium hydroxide at a concentration of 20 mass % and 27 g of pure water.

Next, 7.5 g of an aqueous solution of sodium hydroxide at a concentration of 20 mass % was added and stirred in the prepared aqueous solution of silver-ammine complex for 3 minutes. After that, 357.6 g (12.4 molar equivalent relative to 1 mol of silver) of an aqueous solution of formaldehyde was added as a reducing agent while stirring the aqueous solution of silver-ammine complex to deposit silver particles through reduction. The aqueous solution of tellurium was added 5 seconds after the start of adding the reducing agent. Through this, the tellurium oxide was attached to the surfaces of silver particles. One minute later, 6.01 g of solution of ethanol stearate at a concentration of 1.55 mass % was added to the slurry containing silver particles to terminate the reduction reaction, and the stirring was stopped to cause the silver particles to settle.

Next, the slurry containing precipitated silver particles was filtered, water was passed through the precipitate on filter paper to wash the precipitate with water until the electrical conductivity of cleaning water that had passed through the precipitate reached 0.2 mS/m or less. After that, the precipitate was vacuum-dried at 73° C. for 10 hours to obtain a dried powder. The obtained dried powder was introduced into a crushing machine (SK-10 model available from Kyoritsu Riko Co., Ltd.) to perform a crushing operation for 30 seconds two times. In this way, a tellurium-attached silver powder of Example 1 was obtained.

The obtained tellurium-attached silver powder of Example 1 was subjected to the following measurements.
(EPMA Analysis)

Figure 2:
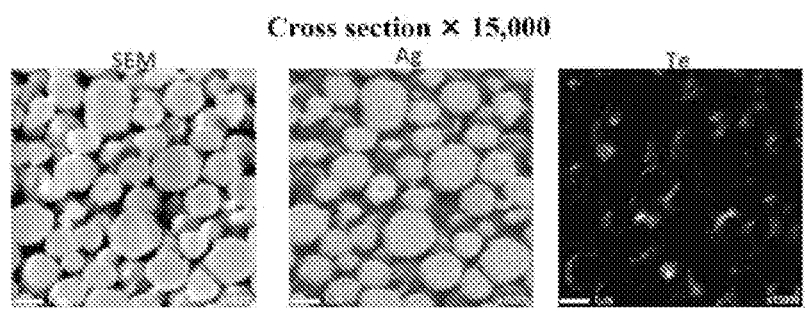
FIG. 2 is a diagram showing elemental mapping images of a cross section of the silver powder obtained in Example 1.

The measurement was performed on a surface and a cross section of the tellurium-attached silver powder of Example 1 using an electron probe micro analyzer EPMA (apparatus name: JXA-8200 available from JEOL, Ltd.) at a magnification of 15,000 times. The results are shown in FIGS. 1 and 2. FIG. 1 is a diagram showing elemental mapping images of a surface of the silver powder of Example 1. FIG. 2 is a diagram showing elemental mapping images of a cross section of the silver powder of Example 1. As shown in FIGS. 1 and 2, it was found that the Te component was attached to the surfaces of the silver particles, and the Te component was partially attached to the surfaces of the silver particles rather than uniformly.
(Amount of Te)

The amount of tellurium (Te) contained in the silver powder was measured. Specifically, the amount of silver was measured using a weight method (mass method) in which the tellurium-attached silver powder was completely dissolved in nitric acid, hydrochloric acid was then added to precipitate silver chloride, the precipitate was filtered, and the mass of silver chloride was measured. Also, the amount of Te was measured based on inductively coupled plasma (ICP) spectrometry (SPS 5100 available from SII Inc.) after the tellurium-attached silver powder was heated and dissolved in nitric acid. As a result, it was found that the amount of Te relative to the amount of silver was 1.3 mass %. In this measurement, tellurium in the form of a metal oxide, tellurium in the form of a metal, and tellurium in the form of an alloy were not distinguished therebetween because the measurement was performed after dissolving them, and the total amount of the metal component relative to the amount of silver was 1.3 mass %.

(ESCA Measurement)

The state of the surface of the tellurium-attached silver powder (at a depth of about several nanometers from the surface of the sample) was analyzed using an ESCA apparatus (Model 5800 available from ULVAC-PHI, Inc.). Specifically, the measurement was performed to determine whether the tellurium constituting the adherent is in the form of an oxide, an elemental metal or an alloy. As the measurement condition, the analysis area was set to 800 pap, and the applied power was set to 150.0 W. As a result, it was found that at least elemental metal Te (or alloyed Te) and $TeO_2$ existed together on the surface of the tellurium-attached silver powder, and the ratio of the number of Te atoms between the elemental metal Te (or the alloyed Te) and $TeO_2$ was 12:7. In the state analysis, the state of the surface of the tellurium-attached silver powder was identified based on the difference in atomic binding energy, and thus it was not possible to make a distinction between elemental metal Te and alloyed Te.

The total amount of the metal component relative to the amount of silver was 1.3 mass %, from which the amount of the metal component (Te) constituting the Te oxide was calculated to be 0.48 mass % relative to the amount of silver.

(Particle Size Distribution Measurement)

The tellurium-attached silver powder of Example 1 was subjected to particle size distribution measurement. Specifically, 0.1 g of the tellurium-attached silver powder was dispersed in isopropyl alcohol (IPA), which was then stirred for 2 minutes using a biomixer (Model BM-4) available from Nihonseiki Kaisha Ltd., and then, the measurement was performed using a laser diffraction particle size distribution measurement apparatus (Microtrac MT 3300 EXIT available from Nikkiso Co., Ltd.). As a result, the cumulative 10% particle size (D10) was 1.11 μm, the cumulative 50% particle size was 1.77 μm, and the cumulative 90% particle size (D90) was 2.93.

(Measurement of Specific Surface Area)

The tellurium-attached silver powder of Example 1 was subjected to specific surface area measurement. Specifically, using a BET specific surface area measurement apparatus (Macsorb HM-model 1210 available from Mountech Co., Ltd.), a Ne—$N_2$ mixed gas (30% nitrogen) was allowed to flow into the measurement apparatus at 60° C. for 10 minutes for degassing. After that, the measurement was performed based on the BET single point method. As a result, the specific surface area of the tellurium-attached silver powder of Example 1 was 0.52 $m^2/g$.

(Production of Conductive Paste)

A conductive paste was produced in the manner described below using the tellurium-attached silver powder of Example 1. Specifically, the tellurium-attached silver powder of Example 1 (the amount of tellurium relative to the amount of silver was 1.3 mass %) and a silver powder that did not contain an adherent containing a metal (AG-4-8F available from DOWA High-tech Co., Ltd.) in a total amount of 89.6 mass %, 6.2 mass % of a vehicle for high speed printing (a mixture of terpineol, texanol, and butyl carpitol acetate) as an organic binder, 1.0 mass % of wax (castor oil), 0.4 mass % of dimethylpolysiloxane 100 cs, 0.2 mass % of triethanolamine, 0.2 mass % of oleic acid, 2.0 mass % of a Pb—Te—Bi glass frit, and 0.4 mass % of a solvent (a mixture of terpineol and texanol) were stirred and mixed at 1400 rpm for 30 seconds using a propellerless rotation-revolution stirring and degassing apparatus (AR250 available from Thinky Corporation). After that, the resulting mixture was allowed to pass through a three-roll mill (EXAKT 80S) with a roll gap being set to 100 μm to 20 μm, and the mixture was thus kneaded to obtain a conductive paste. The ratio of the tellurium-attached silver powder relative to the silver powder was adjusted such that the amount of tellurim was 0.015 mass % relative to the total amount of silver contained in the conductive paste.

(Forming Conductive Pattern)

The conductive pattern was formed in the manner described below. First, a 154 mm solid pattern was formed on a silicon substrate for a solar cell (100Ω/☐) by applying an aluminum paste (ALSOLAR 14-7021 available from Toyo Aluminium K.K) to the back side of the substrate using a screen printing machine (MT-320TV available from Micro-tec Co., Ltd.). Next, the conductive paste was filtered through a 500 μm mesh, and then, a finger electrode with a width of 27 μm on a board design basis and four busbar electrodes, each having a width of 0.95 mm on a board design basis, were printed on the surface side of the substrate at a squeegee speed of 350 mm/sec. The substrate was heated with hot air at 200° C. for 10 minutes and then fired at a peak temperature of 770° C. for an in-out time of 41 seconds using a fast firing IR furnace (Fast Firing Test Four-Chamber Furnace available from NGK Insulators, Ltd.). In this way, a conductive pattern was obtained.

(Evaluation of Conductive Pattern)

The conductivity and the adhesive strength of the conductive pattern were measured in the manner described below.

The conductivity of the conductive pattern was evaluated based on series resistance value and conversion efficiency. Specifically, the series resistance value of the obtained conductive pattern was measured using a digital multimeter (R6551 available from Advantest Corporation). Furthermore, the conversion efficiency of the conductive pattern was measured using a solar simulator (WXS-1565-10, AM 1.5 G available from Wacom Manufacturing Co., Ltd.).

The adhesive strength of the conductive pattern was evaluated based on a peel strength obtained by peeling the conductive pattern from the substrate. Specifically, the silicon substrate was divided into a size of about 6 cm×6 cm, and then, a double-sided adhesive tape was attached to the back side of the substrate, and the substrate was fixed. Then, a non-halogen non-rosin based flux was applied to busbar portions on the surface of the substrate using a cotton swab. Next, on a hot plate set at 50° C., a solder ribbon (with a width of 0.9 mm) was placed on the busbars, and the flux was again applied thereto. A soldering iron (set at a temperature of 380° C.) was pressed against an end of the solder ribbon from above the solder ribbon, and moved to the other end of the solder ribbon to solder them together for about 2 to 3 seconds. Then, peel strength (180° peel strength) was measured using a universal tensile testing machine EZ-SX (at a test speed of 15 mm/sec and a stroke of 100 mm) available from Shimadzu Corporation by peeling the solder ribbon in a 180° opposite direction.

(Evaluation of Cross Section of Conductive Pattern)

A cross section of the conductive pattern that has undergone firing was observed to analyze the distribution of Te atoms based on EPMA. The measurement was performed using an electron probe micro analyzer EPMA (apparatus name: JXA-8200 available from JEOL, Ltd.) at a magnification of 3,000 times.

Example 2

In Example 2, a aqueous solution of silver-ammine complex, an aqueous solution of formaldehyde, and an aqueous solution of tellurium were prepared in the same manner as in Example 1. Furthermore, an aqueous solution of reducing agent for post-addition was prepared by adding 10.0 g of 20% aqueous solution of sodium hydroxide to 71.5 g of 21.0% aqueous solution of formaldehyde. In Example 2, as in Example 1, the aqueous solution of formaldehyde and the aqueous solution of tellurium were added to the aqueous solution of silver-ammine complex, and 10 seconds after the addition of the aqueous solution of tellurium, the aqueous solution of reducing agent for post-addition was further added to facilitate the reduction. Then, one minute later, 6.01 g of a solution of ethanol stearate at a concentration of 1.55 mass % was added to the slurry containing silver particles to terminate the reduction reaction, and the stirring was stopped to cause the silver particles to settle. After that, the slurry was subjected to filtering, washing, drying, and crushing in the same manner as in Example 1. In this way, a tellurium-attached silver powder of Example 2 was obtained.

The tellurium-attached silver powder of Example 2 was subjected to measurement to determine the amount of tellurium (Te) contained in the silver powder in the same manner as in Example 1, and it was found that the amount of tellurium (Te) relative to the amount of silver was 3.0 mass %. Also, ESCA measurement was performed, and it was confirmed that elemental metal Te was not present in the adherent, and the adherent was 100% $TeO_2$. Also, for the tellurium-attached silver powder of Example 2, the adherent was subjected to elemental mapping using a field-emission transmission electron microscope (HF-2200 available from Hitachi High-Technologies Corporation), and it was found that Ag, Te, and oxygen were uniformly distributed in the layer of the adherent with a relationship of 1:1:2 in terms of atom %. From the foregoing, it can be expected that Ag and $TeO_2$ are present in an amorphous state in the adherent. Also, the particle size distribution was measured in the same manner as in Example 1, and it was found that the particle size D10 was 1.1 μm, the particle size D50 was 1.7 μm, and the particle size D90 was 2.7 μm. Also, the specific surface area of the tellurium-attached silver powder was measured in the same manner as in Example 1, and it was found that the specific surface area was 0.68 $m^2/g$.

A conductive paste and a conductor pattern were produced and evaluated in the same manner as in Example 1, except that the silver powder of Example 2 was used.

Example 3

In Example 3, a tellurium-attached silver powder of Example 3 was obtained by performing the same operations as those performed in Example 2, except that the amount of tellurium dioxide added was increased from 3.4 g to 5.7 g when preparing an aqueous solution of tellurium.

The tellurium-attached silver powder of Example 3 was subjected to measurement to determine the amount of tellurium (Te) contained in the silver powder in the same manner as in Example 1, and it was found that the amount of tellurium (Te) relative to the amount of silver was 3.6 mass %. Also, ESCA measurement was performed, and it was confirmed that, as in Example 2, elemental metal Te was not present in the adherent, and the adherent was 100% $TeO_2$. Also, it was expected that Ag and $TeO_2$ were present in an amorphous state in the adherent. Also, the particle size distribution was measured in the same manner as in Example 1, and it was found that the particle size D10 was 1.1 μm, the particle size D50 was 1.7 μm, and the particle size D90 was 2.7 μm. Also, the specific surface area of the tellurium-attached silver powder was measured in the same manner as in Example 1, and it was found that the specific surface area was 0.68 $m^2/g$.

A conductive paste and a conductor pattern were produced and evaluated in the same manner as in Example 1, except that the silver powder of Example 3 was used.

Example 4

In Example 4, a bismuth-attached silver powder of Example 4 was produced by performing the same operations as those performed in Example 2, except that an aqueous solution of bismuth was used instead of the aqueous solution of tellurium. The aqueous solution of bismuth was prepared by adding and dissolving 4.367 g of bismuth nitrate pentahydrate (available from Wako Pure Chemical Industries, Ltd., the purity of bismuth nitrate pentahydrate>99.5%) in 10 g of an aqueous solution of sodium hydroxide at a concentration of 20 mass %.

Figure 3:
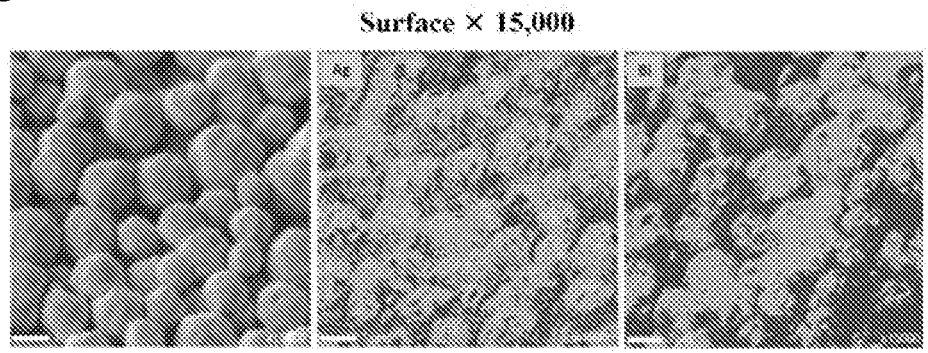
FIG. 3 is a diagram showing elemental mapping images of a surface of a silver powder obtained in Example 4.
Figure 4:
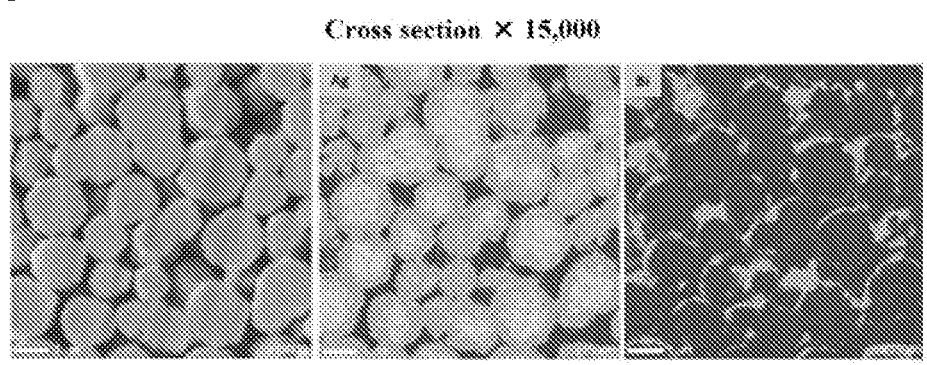
FIG. 4 is a diagram showing elemental mapping images of a cross section of the silver powder obtained in Example 4.

Measurement was performed on a surface and a cross section of the bismuth-attached silver powder of Example 4 using an EPMA apparatus in the same manner as in Example 1, and the results shown in FIGS. 3 and 4 were obtained. FIG. 3 is a diagram showing elemental mapping images of a surface of the silver powder obtained in Example 4. FIG. 4 is a diagram showing elemental mapping images of a cross section of the silver powder obtained in Example 4. As shown in FIGS. 3 and 4, it was found that the Bi component was attached to the surfaces of the silver particles, and the Bi component was partially attached to the surfaces of the silver particles rather than uniformly.

The bismuth-attached silver powder of Example 4 was subjected to measurement to determine the amount of bismuth (Bi) contained in the silver powder in the same manner as in Example 1, and it was found that the amount of bismuth (Bi) relative to the amount of silver was 3.0 mass %. Also, ESCA measurement was performed, and it was confirmed that elemental metal Bi was not present in the adherent, and the adherent was 100% $Bi_2O_3$. Also, the particle size distribution was measured in the same manner as in Example 1, and it was found that the particle size D10 was 1.3 the particle size D50 was 1.9 μm, and the particle size D90 was 2.9 Also, the specific surface area of the bismuth-attached silver powder was measured in the same manner as in Example 1, and it was found that the specific surface area was 0.60 $m^2/g$.

A conductive paste and a conductor pattern were produced and evaluated in the same manner as in Example 1, except that the silver powder of Example 4 was used.

Comparative Example 1

In Comparative Example 1, a conductive paste was produced and evaluated in the same manner as in Example 1, except that only a silver powder free of an adherent containing a metal was added without using the tellurium-attached silver powder.

Comparative Example 2

In Comparative Example 2, a conductive paste was produced and evaluated in the same manner as in Example 1, except that, instead of the tellurium-attached silver powder, a metallic tellurium powder (with a purity of 99.9% available from Kojundo Chemical Lab. Co., Ltd.) was mixed such that the amount of tellurium was 0.015 mass % relative to the total amount of silver contained in the conductive paste.

Comparative Example 3

In Comparative Example 3, a conductive paste was produced and evaluated in the same manner as in Example 1, except that, instead of the tellurium-attached silver powder, a tellurium dioxide powder (a tellurium dioxide powder with a purity of 99.9% available from Wako Pure Chemical Industries, Ltd.) was mixed such that the amount of tellurium was 0.015 mass % relative to the total amount of silver contained in the conductive paste.

<Evaluation Results>

The evaluation results of the silver powders obtained in Examples and Comparative Examples are shown in Table 1 and Table 2 given below. Table 1 shows the specific surface area, the particle size distribution, the amount of metal component relative to the amount of silver in the adherent, and the result of state analysis of the adherent based on ESCA for each of the silver powders obtained in Examples 1 to 4. For the purpose of comparison with the silver powders of Examples 1 to 4 to which a metal oxide or the like was attached, Table 1 also shows the specific surface area and the particle size distribution of an adherent-free silver powder (AG-4-8F available from DOWA High-tech Co., Ltd.). Table 2 shows the conversion efficiency, the series resistance, and the peel strength for each of the conductor patterns produced using the silver powders of Examples 1 to 4 and the silver powders of Comparative Examples 1 to 3.

TABLE 1

| Silver powder | Specific surface area [m$^2$/g] | D10 [μm] | D50 [μm] | D90 [μm] | Amount of metal component relative to amount of silver in adherent and Result of state analysis based on ESCA |
|---|---|---|---|---|---|
| Example 1 | 0.52 | 1.1 | 1.8 | 2.9 | 1.3 wt % Te (Te or Te alloy:TeO$_2$ = 12.7) |
| Example 2 | 0.68 | 1.1 | 1.7 | 2.7 | 3.0 wt % Te (100% TeO$_2$) |
| Example 3 | 0.68 | 1.1 | 1.7 | 2.7 | 3.6 wt % Te (100% TeO$_2$) |
| Example 4 | 0.60 | 1.3 | 1.9 | 2.9 | 3.0 wt % Bi (100% Bi$_2$O$_3$) |
| AG-4-8F | 0.44 | 1.2 | 1.9 | 3.0 | — |

As shown in Table 1, in the silver powders obtained in Examples 1 to 4 that contained an adherent made of tellurium or bismuth, the amount of the metal component relative to the amount of silver contained in the adherent was within a range of 0.1 mass % or more and 10 mass % or less. Also, it was confirmed that, in the silver powders obtained in Examples 1 to 4 that contained an adherent, the specific surface area was larger than that of the adherent-free silver powder (AG-4-8F).

TABLE 2

| Silver powder | Short-circuit current [A] | Open circuit voltage [V] | Fill factor [%] | Conversion efficiency (Ave.) [%] | Series resistance [ohm] | Peel Strength (Ave.) [N] |
|---|---|---|---|---|---|---|
| Example 1 | 8.99 | 0.64 | 79.5 | 18.7 | 0.0064 | 4.4 |
| Example 2 | 9.08 | 0.64 | 78.8 | 18.8 | 0.0068 | 4.5 |
| Example 3 | 9.08 | 0.64 | 78.9 | 18.8 | 0.0068 | 4.4 |
| Example 4 | 8.99 | 0.64 | 80.7 | 19.0 | 0.0063 | 4.3 |
| Comp. Ex. 1 | 8.98 | 0.64 | 79.6 | 18.7 | 0.0064 | 4.0 |
| Comp. Ex. 2 | 8.73 | 0.63 | 79.4 | 18.1 | 0.0068 | 2.3 |
| Comp. Ex. 3 | 8.72 | 0.63 | 79.7 | 18.1 | 0.0066 | 2.5 |

As shown in Table 2, it was confirmed that, with the conductive pastes of Examples 1 to 3 obtained by adding the tellurium-attached silver powder and the conductive paste of Example 4 obtained by adding the bismuth-attached silver powder, the peel strength can be improved while maintaining the conversion efficiency, when compared with the conductive paste of Comparative Example 1 containing only a silver powder free of an adherent containing a metal oxide. Also, it was confirmed that, with the conductive paste of Example 1, not only the series resistance value can be reduced to improve the conversion efficiency, but also the peel strength can be improved significantly, when compared with the conductive paste of Comparative Example 2 obtained by adding the metallic tellurium powder and the silver powder and the conductive paste of Comparative Example 3 obtained by adding the tellurium dioxide powder and the silver powder.

Figure 5:
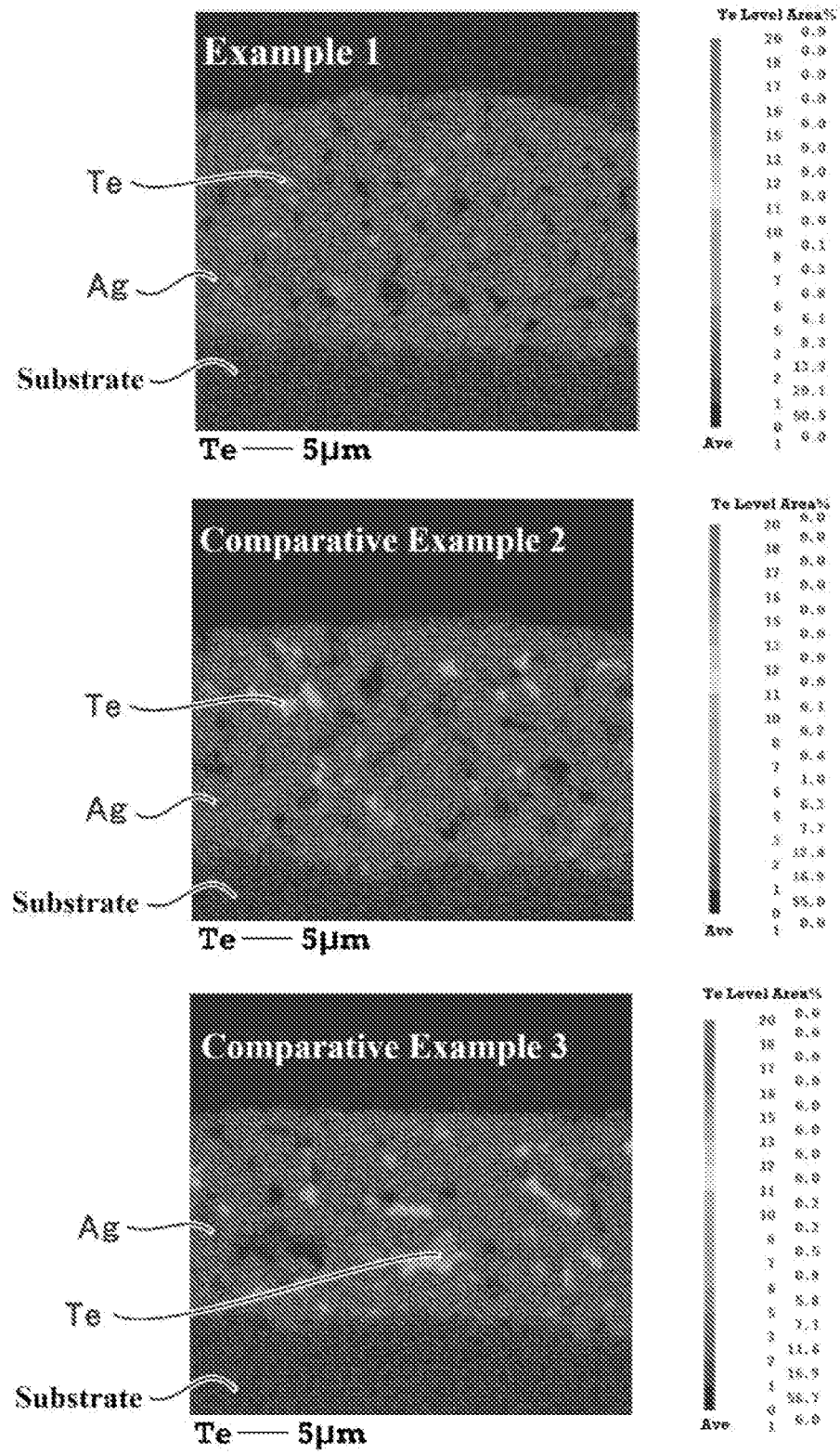
FIG. 5 is a diagram showing elemental mapping images of cross sections of conductor patterns obtained in Example 1, Comparative Example 2, and Comparative Example 3.

Also, cross sections of the conductor patterns of Example 1, Comparative Example 2, and Comparative Example 3 were observed using an EPMA apparatus, and the results shown in FIG. 5 were obtained. FIG. 5 is a diagram showing elemental mapping images of cross sections of the conductor patterns of Example 1, Comparative Example 2, and Comparative Example 3. It was confirmed, from FIG. 5, that a conductive pattern (blue: made mainly of silver) including gaps (black) was formed on the substrate (dark blue), and the Te component (light blue, yellow green, and yellow) was distributed in the conductive pattern. Specifically, it was found that, in Comparative Examples 2 and 3, more Te component-present portions (yellow green and yellow) were observed, and the Te component was unevenly distributed, as compared with Example 1. It was also found that, as in Example 1, by using the silver powder that includes an adherent that contains a metal oxide that has a melting point lower than the melting point of silver on the surfaces of silver particles, it is possible to obtain a conductive pattern in which the metal component that constitutes the metal oxide is appropriately dispersed. As a result, the conductive pattern can have a high adhesive strength.

As described above, by attaching an oxide of a metal component that has a melting point lower than the melting point of silver to the surfaces of silver particles, when a conductive paste obtained using the silver particles is sintered to form a conductive pattern, an uneven distribution of silver and the metal component with a low melting point in the thickness direction of the conductive pattern can be suppressed, and thus the adhesive strength of the conductive pattern can be improved while maintaining the conductivity of the conductive pattern at a high level.

The invention claimed is:

1. A silver powder comprising:
   silver particles; and
   an adherent that is attached to surfaces of the silver particles and has a melting point lower than a melting point of silver and the adherent contains a metal oxide that has a melting point lower than the melting point of silver, wherein the metal oxide is at least one of a Te oxide, a Bi oxide, a Pb oxide, a Tl oxide, and a V oxide.

2. The silver powder according to claim 1,
   wherein an amount of a metal component that constitutes the metal oxide is 0.01 mass % to 10 mass % relative to an amount of silver contained in the silver power.

3. The silver powder according to claim 1,
   wherein the adherent includes a first adherent that contains the metal oxide and a second adherent that contains a metal that is the metal component that constitutes the metal oxide or an alloy made of the metal component and silver.

4. The silver powder according to claim 3,
   wherein the metal component is at least one of Te, Bi, Pb, Tl, and V.

5. The silver powder according to claim 1,
   wherein a total amount of the metal component, excluding silver and contained in the adherent, that constitutes the metal oxide of the adherent is 0.1 mass % to 10 mass % relative to an amount of silver contained in the silver power.

6. A conductive paste comprising:
   the silver powder according to claim 1;
   a silver powder that does not contain a metal component other than silver on the surface thereof excluding unavoidable impurities, on a surface of the silver powder;
   an organic binder;
   a glass frit; and
   a solvent.

7. The conductive paste according to claim 6,
   wherein an amount of the metal component that constitutes the metal oxide contained in the silver powder is 0.001 mass % to 0.03 mass % relative to an amount of silver contained in the conductive paste.

8. The conductive paste according to claim 6,
   wherein the glass frit contains a component selected from Pb, Te, Li, Zn, Si, Al and Bi.

9. A method for producing the silver powder according to claim 1, the method comprising:
   adding a reducing agent and an aqueous solution that contains a metal component that constitutes a metal oxide that has a melting point lower than a melting point of silver to a silver complex solution,
   wherein the metal oxide of the metal component is deposited on the surfaces of the silver particles to attach the metal oxide of the metal component to the surfaces of the silver particles while the silver particles are deposited through reduction, and thereby forming an adherent that contains the metal oxide that has the melting point lower than the melting point of silver and has the melting point lower than a melting point of silver, and
   wherein the aqueous solution is an aqueous solution in which at least one of Te, Bi, Pb, Tl, V is dissolved as the metal component.

* * * * *